(12) United States Patent
Clark et al.

(10) Patent No.: US 7,797,898 B2
(45) Date of Patent: Sep. 21, 2010

(54) PORTABLE PANEL CONSTRUCTION AND METHOD FOR MAKING THE SAME

(75) Inventors: Roger Clark, Milwaukee, WI (US); George Gula, Verona, PA (US)

(73) Assignee: Palmer/Snyder Furniture Company, Lexington, KY (US)

( * ) Notice: Subject to any disclaimer, the term of this patent is extended or adjusted under 35 U.S.C. 154(b) by 0 days.

(21) Appl. No.: 12/433,271

(22) Filed: Apr. 30, 2009

(65) Prior Publication Data
US 2009/0211499 A1  Aug. 27, 2009

Related U.S. Application Data

(60) Division of application No. 12/142,769, filed on Jun. 19, 2008, now Pat. No. 7,698,872, which is a continuation of application No. 11/564,075, filed on Nov. 28, 2006, now Pat. No. 7,401,442.

(51) Int. Cl.
*E04C 2/54* (2006.01)
(52) U.S. Cl. ............... 52/309.1; 52/582.1; 52/582.2; 428/116; 428/72
(58) Field of Classification Search ... 52/783.1–783.19, 52/582.1, 582.2, 578; 428/116, 73, 118, 428/327, 72, 60, 76
See application file for complete search history.

(56) References Cited

U.S. PATENT DOCUMENTS

| | | | |
|---|---|---|---|
| 2,490,577 A | 12/1949 | Brown | |
| 2,849,758 A | 9/1958 | Plumley et al. | |
| 2,907,127 A | 10/1959 | Waugh et al. | |
| 2,911,274 A | 11/1959 | Grube | |
| 3,310,919 A | 3/1967 | Bue et al. | |
| 3,323,797 A | 6/1967 | Horton, Jr. | |
| 3,450,593 A | 6/1969 | Fossier et al. | |
| 3,512,324 A | 5/1970 | Reed | |
| 3,567,260 A | 3/1971 | Norris | |
| 3,582,447 A | 6/1971 | Stoiki | |
| 3,630,813 A | 12/1971 | Allen | |
| 3,676,279 A | 7/1972 | Beaver | |

(Continued)

FOREIGN PATENT DOCUMENTS

DE    298 09 543 U1    5/1998

OTHER PUBLICATIONS

Cageao, Ronald A., Bayer MaterialScience LLC, "Studies of Composites Made With Baypreg F: Component Selection For Optimal Mechanical Properties," Polyurethanes 2004, Oct. 18-20, 2004.

*Primary Examiner*—Richard E Chilcot, Jr.
*Assistant Examiner*—Mark R Wendell
(74) *Attorney, Agent, or Firm*—Waddey & Patterson, P.C.; Phillip E. Walker (57) ABSTRACT

Disclosed herein is a portable panel having numerous favorable characteristics. The panel comprises a core having a length, a width, a first side and a second side. A first fiber layer is attached to the first side while a second fiber layer is attached to the second side. A first polyurethane layer is impregnated in the first fiber layer while a second polyurethane layer is impregnated into the second fiber layer. A first skin is attached to the first polyurethane layer while a second skin is attached to the second polyurethane layer. The panel can be used in the manufacture of tables, flooring, risers, stages, bleachers, and the like.

6 Claims, 11 Drawing Sheets

U.S. PATENT DOCUMENTS

| | | |
|---|---|---|
| 3,826,056 A | 7/1974 | Smith et al. |
| 3,868,297 A | 2/1975 | Jamison et al. |
| 3,982,057 A | 9/1976 | Briggs et al. |
| 4,144,681 A | 3/1979 | Leffler et al. |
| 4,353,947 A | 10/1982 | Northcutt |
| 4,411,118 A | 10/1983 | Claver |
| 4,522,284 A | 6/1985 | Fearon et al. |
| 4,603,531 A | 8/1986 | Nash |
| 4,645,171 A | 2/1987 | Heide |
| 4,680,216 A | 7/1987 | Jacaruso |
| 4,879,152 A | 11/1989 | Green |
| 4,931,340 A | 6/1990 | Baba et al. |
| 4,973,508 A | 11/1990 | Bretz |
| 4,988,131 A | 1/1991 | Wilson et al. |
| 5,006,391 A | 4/1991 | Biersach |
| 5,061,541 A | 10/1991 | Gertel |
| 5,070,662 A | 12/1991 | Niese |
| 5,154,963 A | 10/1992 | Terry |
| 5,288,538 A | 2/1994 | Spears |
| 5,348,778 A | 9/1994 | Knipp et al. |
| 5,496,610 A | 3/1996 | Landi et al. |
| 5,569,508 A | 10/1996 | Cundiff |
| 5,626,157 A | 5/1997 | Galpin et al. |
| 5,634,309 A | 6/1997 | Polen |
| 5,667,866 A | 9/1997 | Reese, Jr. |
| 5,776,582 A | 7/1998 | Needham |
| 5,888,612 A | 3/1999 | Needham et al. |
| 5,947,037 A | 9/1999 | Hornberger et al. |
| 5,972,468 A | 10/1999 | Welch et al. |
| 5,992,112 A | 11/1999 | Josey |
| 6,061,993 A | 5/2000 | Bendixen et al. |
| 6,117,518 A | 9/2000 | Cawse et al. |
| 6,128,881 A | 10/2000 | Bue et al. |
| 6,189,283 B1 | 2/2001 | Bentley et al. |
| 6,227,515 B1 | 5/2001 | Broyles |
| 6,235,367 B1 | 5/2001 | Holmes et al. |
| 6,253,530 B1 | 7/2001 | Price et al. |
| 6,446,413 B1 | 9/2002 | Gruber |
| 6,455,131 B2 | 9/2002 | Lopez-Anido et al. |
| 6,505,452 B1 | 1/2003 | Hannig et al. |
| 6,526,710 B1 | 3/2003 | Killen |
| 6,743,497 B2 | 6/2004 | Ueda et al. |
| 6,753,061 B1 | 6/2004 | Wedi |
| 6,761,953 B2 | 7/2004 | Haas et al. |
| 6,769,218 B2 | 8/2004 | Pervan |
| 6,837,171 B1 | 1/2005 | Clark et al. |
| 6,865,856 B2 | 3/2005 | Kim et al. |
| 6,913,667 B2 | 7/2005 | Nudo et al. |
| 7,197,852 B2 | 4/2007 | Grillos |
| 2006/0003155 A1 | 1/2006 | Stewart |
| 2006/0204714 A1 | 9/2006 | Wang et al. |

FIG. 14

PORTABLE PANEL CONSTRUCTION AND METHOD FOR MAKING THE SAME

CROSS-REFERENCES TO RELATED APPLICATIONS

This application is a Divisional application which claims benefit of co-pending U.S. patent application Ser. No. 12/142,769 filed Jun. 19, 2008, entitled "New Portable Panel Construction and Method for Making the Same." which claims benefit of U.S. patent application Ser. No. 11/564,075 filed Nov. 28, 2006 and issued as U.S. Pat. No. 7,401,442, entitled "New Portable Panel Construction and Method for Making the Same."

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described or discussed herein are hereby incorporated by reference in their entireties.

BACKGROUND OF THE INVENTION

The present invention relates to an improved panel. More specifically, without limitation, this invention relates to a panel made for use in portable flooring, folding tables, risers/platforms/event staging, and wall partitions.

There are numerous industries that use portable equipment and items in the preparation and production of events associated with those industries. The portable equipment used in and at these events are typically assembled and/or positioned prior to the event and removed after the event to allow alternate uses and/or different arrangements of the event venues. Examples of types of equipment that are assembled, moved and/or positioned during these events include portable flooring (such as dance floors, tent floors, stadium floors, etc.), folding tables, bench seating, event platforms/risers/staging, walls, and wall partitions.

For each of these various pieces of equipment, one of the general desirable characteristics is a generally planar shaped surface on which people and/or items will walk, stand, or are placed. Other desirable characteristics include high surface and structural durability, light weight, ease of assembly and disassembly, waterproof, various aesthetic patterns, images, and/or colors on the planar surfaces, and cost effective equipment pieces. To this end there have been numerous attempts in the art to construct various portable tables, portable floors, and the like. Examples of these attempts include U.S. Pat. Nos. 2,490,577, 2,849,758, 2,907,127, 2,911,274, 3,310,919, 3,323,797, 3,450,593, 3,512,324, 3,567,260, 3,582,447, 3,630,813, 3,676,279, 3,826,056, 3,868,297, 4,144,681, 4,353,947, 4,522,284, 4,645,171, 4,680,216, 4,879,152, 4,931,340, 4,973,508, 4,988,131 5,006,391, 5,070,662, 5,061,541, 5,154,963, 5,288,538, 5,348,778, 5,496,610, 5,569,508, 5,626,157, 5,634,309, 5,667,866, 5,776,582, 5,888,612, 5,947,037, 5,972,468, 5,992,112, 6,061,993, 6,117,518, 6,128,881 6,189,283 6,227,515, 6,235,367, 6,253,530, 6,446,413, 6,445,131, 6,505,452, 6,526,710, 6,743,497, 6,753,061, 6,761,953, 6,837,171 and 6,865,856. These patents are directed at various designs for tables, panels, locking mechanisms, portable flooring and the like. These patents use less than ideal methods to construct the substantially planar surfaces and connect these surfaces.

For example, in the portable flooring industry conventional flooring panels and the methods for making the same have several drawbacks. One type of typical conventional construction includes using oriented strand board or plywood cut to a preferred size from a large blank as the core structure. The perimeter of this core is machined to provide a contour to accept an edge and the core is coated on one side with a protective film for moisture protection. An edge structure is cut to a desired length and machined to facilitate assembly to the core. Then vinyl or wood parquet tiles are manually placed with adhesive glue onto one of the planer surfaces and then pressed and cured for somewhere between six to eight hours. The excess glue is cleaned off and the locking hardware is attached around the exterior.

An alternate conventional method of making the panels includes cutting a foam core to the preferred size and machining it to provide space for the locking hardware. Steel skins are cut and sized to fit over the foam and are glued to the foam core. A laminate skin is glued to the steel skin and then the panel is pressed and cured. Then the panel is placed into a mold wherein an elastomeric edging is molded around the panel perimeter. The locking hardware is installed once the panel is removed from the mold.

Both of these conventional methods result in either very heavy panels that are difficult to transport or panels susceptible to water damage. Both of these methods are labor intensive, while the show surfaces, or show skins, of these panels are susceptible to glue failure rendering these panels disfigured and/or unusable.

What is needed then is a new panel and method for making the same that combines a light weight and durable construction for easy and convenient transport together with the ability to withstand the adverse affects of water and prolonged product life in use. The preferable panel is manufactured with more cost effective, less labor intensive methods to make the panel affordable to a broad cross-section of the market. This needed panel is lacking in the art.

BRIEF SUMMARY OF THE INVENTION

Disclosed herein is a portable panel having numerous favorable characteristics. The panel comprises a core having a length, a width, a first side and a second side. A first fiber layer is attached to the first side while a second fiber layer is attached to the second side. A first polyurethane layer is impregnated in the first fiber layer while a second polyurethane layer is impregnated into the second fiber layer. A first outer skin is attached to the first polyurethane layer while a second outer skin is attached to the second polyurethane layer. Each of these steps can take place individually then the composite is placed into a press for a cure cycle.

Also disclosed is a table comprising support legs and a planar surface attached to the support legs. The planar surface includes a core having first and second fiber layers attached on first and second sides of a core. First and second polyurethane layers impregnate the first and second fiber layers, respectively, while first and second outer skins are attached to the first and second polyurethane layers, respectively. Each of these steps can take place individually then the composite is placed into a press for a cure cycle.

Also included is a portable floor comprising a plurality of panels. Each panel includes a core having first and second sides. The first side has an attached first fibered layer impregnated by a first polyurethane layer and a first skin attached to the first polyurethane layer. Attached to the second side of the core is a second fiber layer impregnated with a second polyurethane layer having a second skin attached to the second polyurethane layer. A frame surrounds the core wherein the frame includes two male sides and two female sides. The female sides include an engaging location and a channel having a channel length substantially equal to the core length. The male sides include a protrusion shaped to engage the channel and a locking mechanism. The protrusion has a protrusion length substantially equal to the channel length.

Also included is a method of constructing a panel. The method comprises providing a core, attaching a first fiber layer to the first side of the core, and attaching a second fiber layer to the second side of the core. The method further includes impregnating first and second polyurethane layers into the first and second fiber layers, respectively, and preferably immediately attaching a first skin to the first polyurethane layer and a second skin to the second polyurethane layer. The entire composite is then placed in a press where it cures for a period.

Also included is a method of preventing lateral panel movement when a floor is assembled. The panels are secured together by the cam locks which are located in the male extrusion lengths. The method used to prevent the panels from sliding laterally is accomplished with apertures located on the male side in the section cutout for the lock to receive two protruding pieces, such as cap head screws, located on the female side.

The integration of light weight panel technology into a series of products with specific advantages in production and use is taught with this disclosure. The inventive panels relate generally to a process of polyurethane construction using combinations of fiber layers arrayed on both sides of a light weight core material with external skins bonded integrally to the polyurethane layers. The various layers can be bonded to both sides of the panel through the polyurethane polymerization process.

Advantages of the panels of the current invention, as compared to those of the prior art, include a waterproof characteristic and a lighter weight panel that facilitates transportation and assembly. The current invention can have a reversibility option with multiple patterns, designs and/or color options on the opposing sides. The various layers and skin have superior adhesion due to the impregnation and attachment of the skins during the curing process and the superior adhesive characteristics of polyurethane. The inventive panels have a substantial labor saving cost and specifically do not require a mold for their construction. This is an advantage since the use of a mold can severely restrict the economics of producing large panels and requires significant capital investment for the molds and presses. A mold also requires cleaning and maintenance both of which add to cost and time for the production of the panels. As such, the elimination of the use of a mold in panel construction can greatly reduce the production time and increase cost savings during the production of the inventive panels.

For example, the molds discussed in some of the prior art, namely U.S. Pat. No. 6,761,953 use an open mold containing the outer layer and optionally the decorative layer. The prior art fails to place the layers on to the composite materials outside of a press and without a mold. The production of the current inventive panels is facilitated by the flat geometry of the parts and the use of a pre formed perimeter enclosure, such as aluminum or elastomeric edging. The elastomeric edge can provide part shape opportunities that are not possible with extrusion.

Additionally, the inventive panels can be approximately 30% thinner than the existing panels which can enhance the safe use and operation of the panel. For example a thinner panel reduces the likelihood of trips and falls caused by the thickness of the panels when laid flat and used in a portable flooring embodiment. Additionally, the exterior surfaces on the inventive panels are superior in terms of wear, durability, and maintenance thereof. Additionally the panel lateral movement suppression system is a unique, cost effective, and practical method to prevent the panels from sliding when engaged.

The inventive panels can have various applications in numerous industries. These industries include hospitality and entertainment industries such as: hotel, recreation centers, banquet halls, conference centers, stadiums, schools, outdoor activities with and without tents, and other similar facilities/locations. For example, portable flooring made in accordance with the current inventive panels can be set up and used indoors or outdoors with minimal assembly and disassembly time. These inventive panels facilitate these applications due to their strength, durability, waterproof nature, light weight, and positive interconnection between adjacent panels. For example, dance floors, tent floors, stage floors or other portable flooring applications can be ideally made using the inventive panels. Flooring so made can include a perimeter composed of an elastomeric or extruded metal framework using tongue and groove profiles for panel interconnection. Alternately at least one of the sides can be shaped to interact with supporting feet and/or legs used to facilitate the upright placement of the panels, such as in a wall configuration.

It is therefore a general object of the present invention to provide an improved panel.

Another object of the present invention is to provide a method for making an improved panel.

Still another object of the present invention is to provide an improved panel that can be used in the making of a portable floor, folding tables, risers, event staging, and wall partitions.

Another object of the present invention is to provide portable flooring system having a lateral movement suppression mechanism positioned to restrict movement of panels relative to adjacent panels in the portable flooring system.

Still another object of the present invention is to provide a panel having multiple show surfaces that can vary in appearance, design, texture, color, and the like.

Other and further objects, features and advantages of the present invention will be readily apparent to those skilled in the art upon reading of the following disclosure when taken in conjunction with the accompanying drawings.

DETAILED DESCRIPTION OF THE INVENTION

Figure 13:
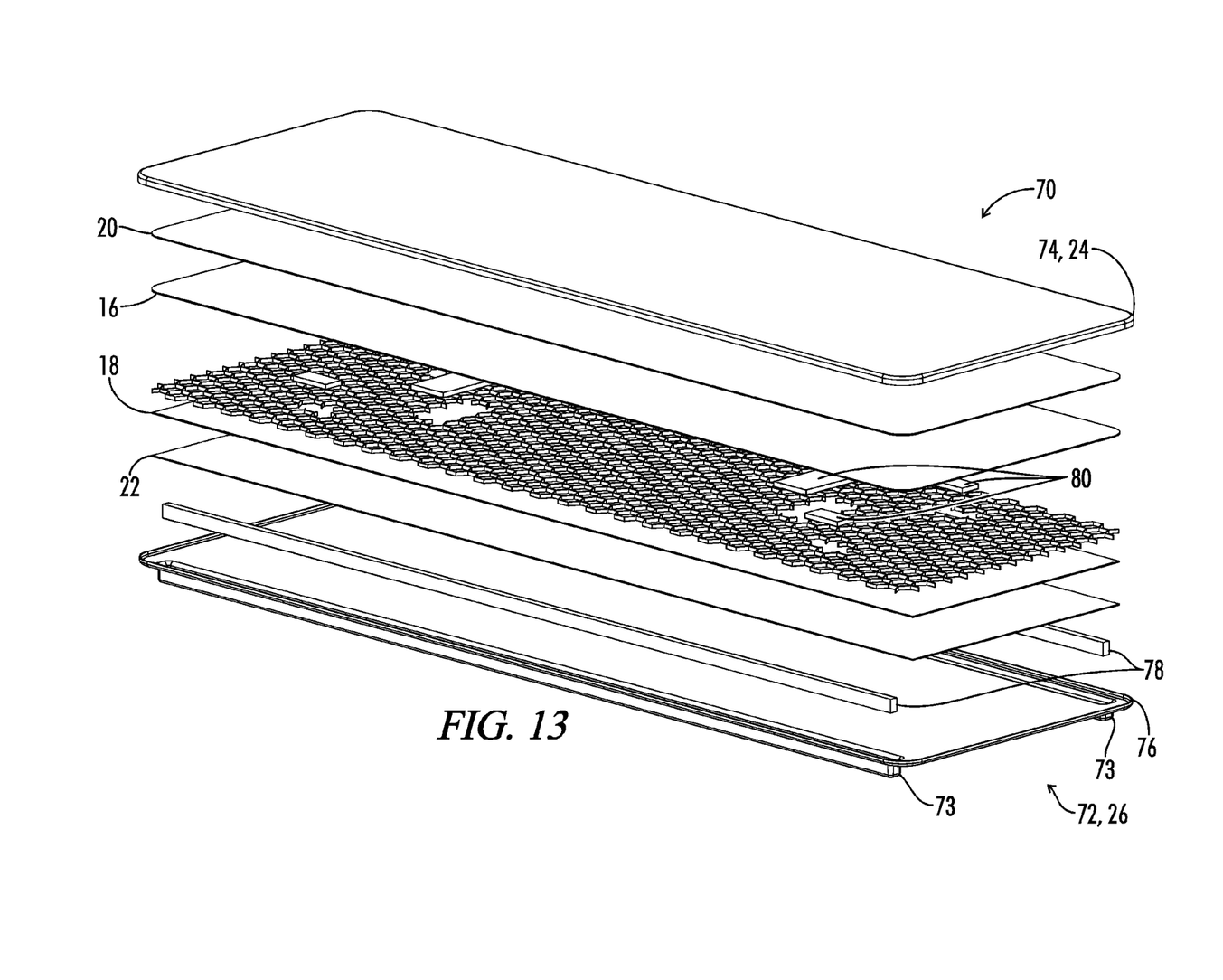
FIG. 13 is an expanded perspective view of a table top made in accordance with the current disclosure.
Figure 14:
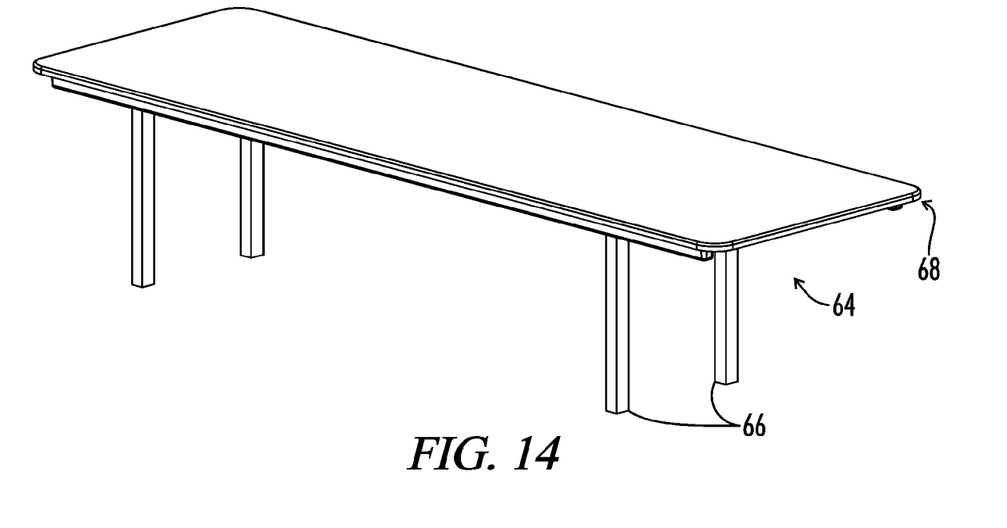
FIG. 14 is a perspective view of a table made in accordance with the current disclosure.

Referring generally to FIGS. 1-14, a panel is shown and generally designated by the numeral 10. The panel 10 has many uses and can be used in conjunction with a portable floor, as seen in FIGS. 1-12, a portable table, as shown in FIGS. 13 and 14, risers, bleachers event staging, walls, and the like.

Figure 1:
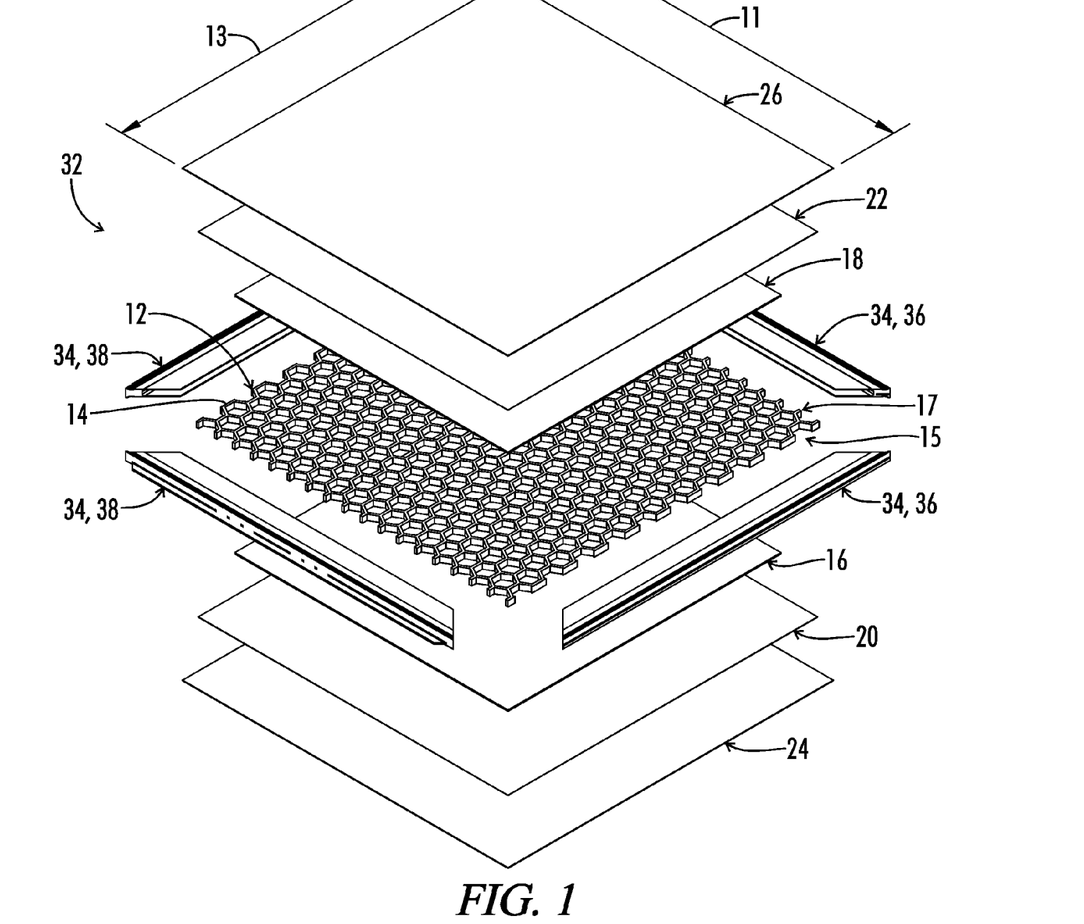
FIG. 1 is an expanded perspective view of a panel made in accordance with the current disclosure and used in connection with portable flooring.

The panel 10 will have a core 12. The core can be made from many materials including paper honeycomb, plastic honeycomb, polyurethane, EPS, wood, metal, and the like. The core can preferably include a plurality of openings 14 wherein the openings are substantially uniformly spaced along the width 11 and length 13 of the core. The openings 14 can be honeycomb in shape as best seen in FIGS. 1 and 13.

First and second fiber layers 16 and 18 are attached to the first and second sides 15 and 17 of the core 12. First and second polyurethane layers 20 and 22 impregnate first and second fiber layers 16 and 18 respectively. First and second skins 24 and 26 are attached to the first and second polyurethane layers 20 and 22, respectively.

The first and second skins 24 and 26, which can also be first and second laminate skins, are attached to the polyurethane layers before the polyurethane layers dry. This creates a strong bond between the skins and the polyurethane layers to increase the durability and attachment thereto. Additionally the impregnation of the polyurethane layers through the fiber layers increases the strength and bonding of the polyurethane layers and skin to the fiber layers and a core upon which they are attached. Prior to application of the polyurethane the fiber layers 16 and 18 are attached to the core 12. For example, staples, glue or other fastening systems known in the art to attach fiber layers to a core layer can be used.

Panels constructed in accordance with this disclosure have many benefits including exhibiting a light weight and a high strength for a given cross section, especially in view of prior art panels. The current inventive panels also include an option for the addition of strengthening ribs and/or edges to the design. Many surface finishes are possible including, but not limited to leather, laminate, vinyl, spray polyurethane, wood grain, texture and color variances, such as the use of various paints. Additionally various patterns and/or designs can be incorporated into the skins 24 and 26. These variances can be realized through the type of skin 24 and 26 that is bonded in with the polyurethane layers 20 and 22 around the fiber layers 16 and 18 and a core 12. Additionally an ultraviolet protective coating can be added if desired. Panels so constructed are also waterproof and have an increased durability for a wide range of uses.

One example of an item in which an inventive panel can be used is in the production of a portable floor. The portable floor 30 includes a plurality of floor panels 32 that include the core 12, fiber layer 16 and 18, polyurethane layers 20 and 22, and skins 22 and 26 as previously discussed. Additionally, each panel includes a frame 34 surrounding the core 12. The frame 34 preferably includes two (2) female sides 36 and two (2) male sides 38. The female side 36 includes a lock engaging section 41, and a channel 42 having a channel length 44 substantially equal to the core length 13. The female side 36 is extruded such that it can directly engage the protrusion 46. The male side 38 includes the protrusion 46 shaped to engage the channel 42 and a locking element 48. The protrusion 46 has a protrusion length 50 substantially equal to the channel length 44.

Figure 2:
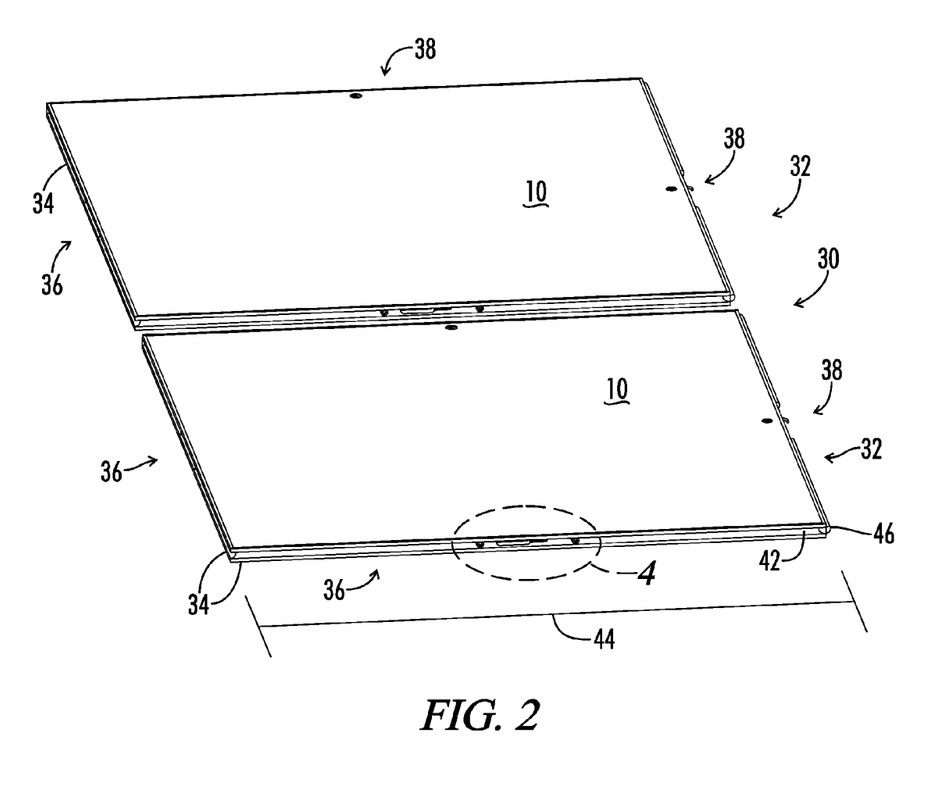
FIG. 2 is a top perspective view of portable flooring made in accordance with the current disclosure.
Figure 3:
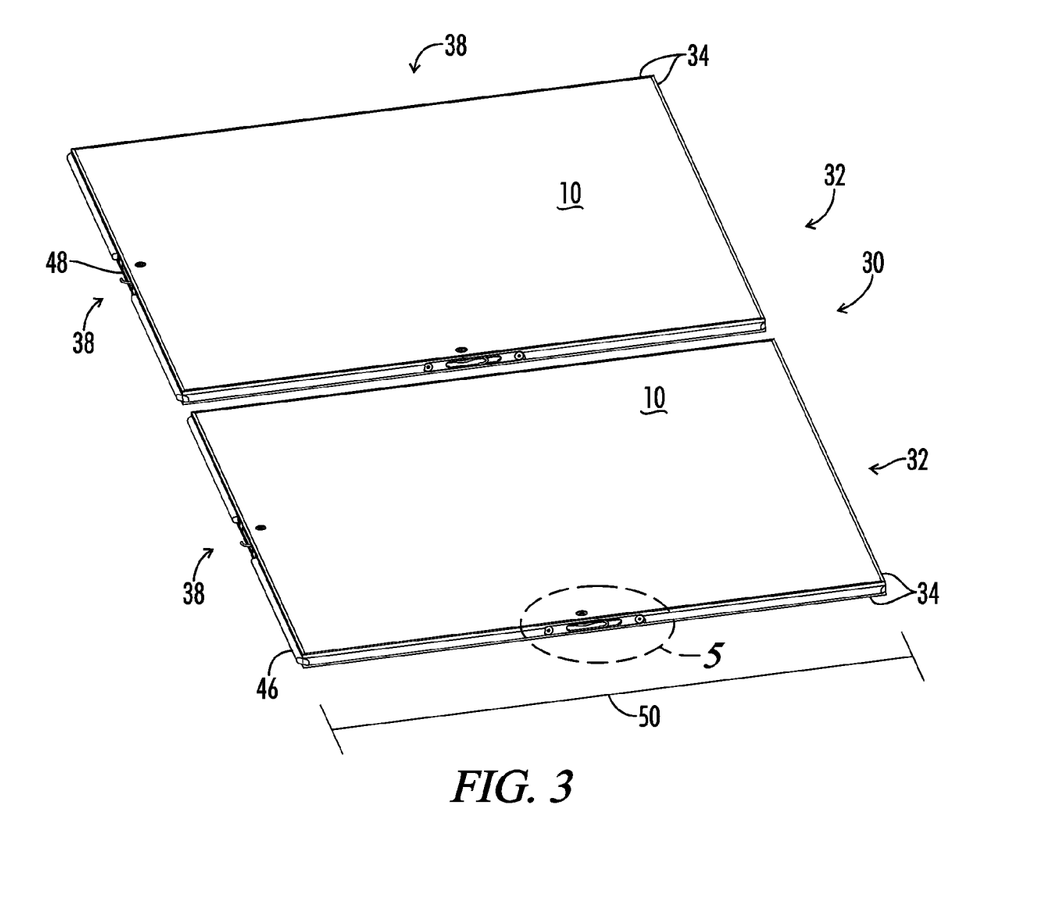
FIG. 3 is a bottom perspective view of FIG. 2.
Figure 4:
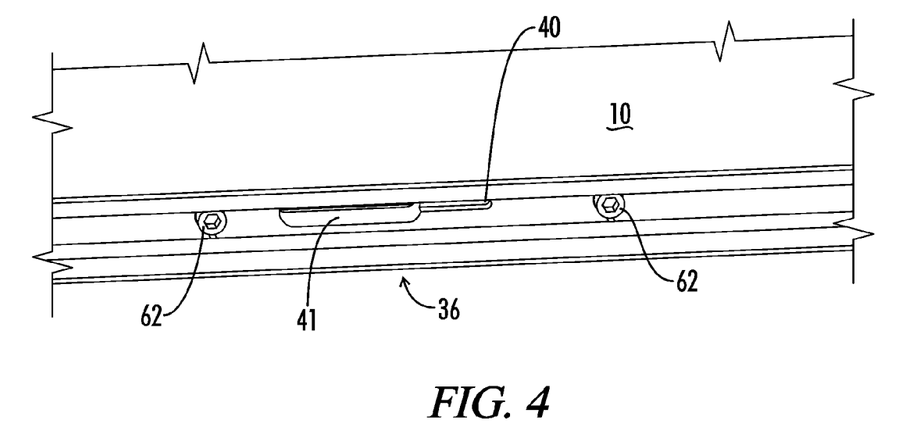
FIG. 4 is a detail view of the area circled and labeled as 4 in FIG. 2.
Figure 5:
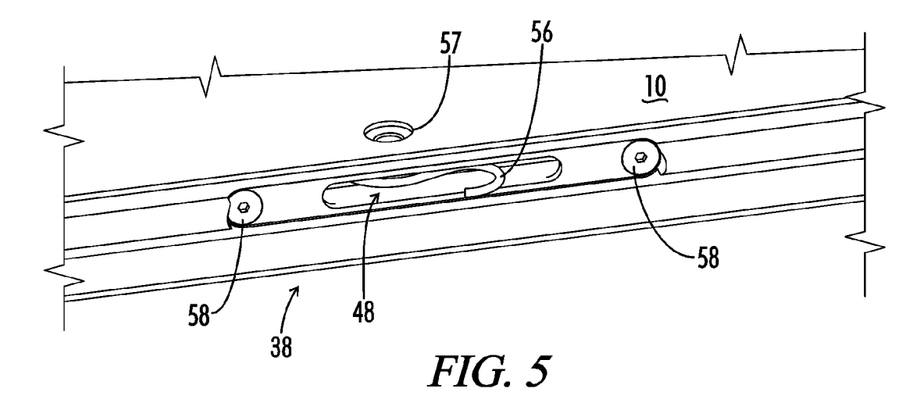
FIG. 5 is a detail view of the area circled and labeled as 5 in FIG. 3.
Figure 6:
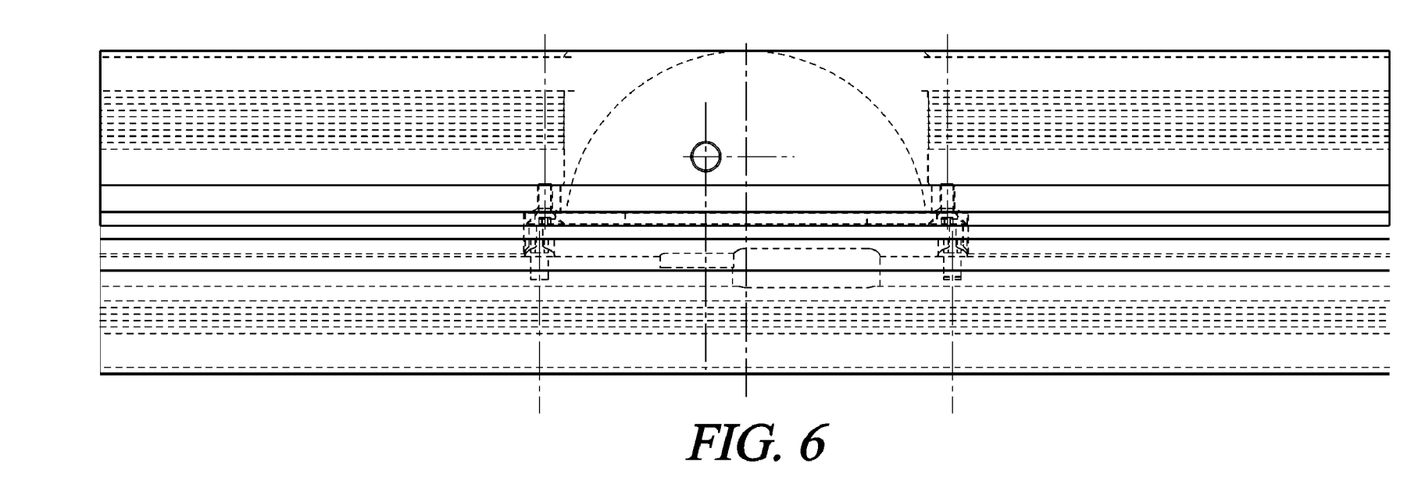
FIG. 6 is a top view of a portion of the frame for a portable floor made in accordance with the current disclosure.
Figure 7:
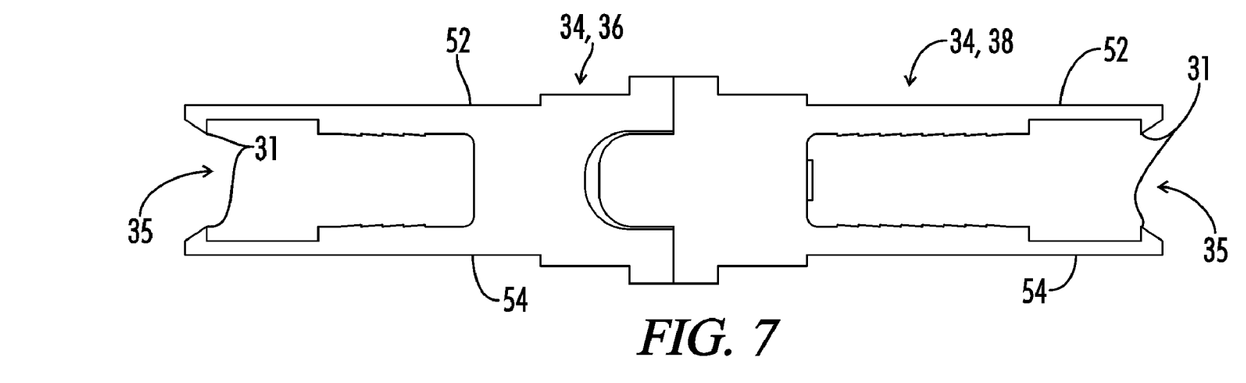
FIG. 7 is a side end view of FIG. 6 view showing the male and female sides of the frame engaged.
Figure 8A:
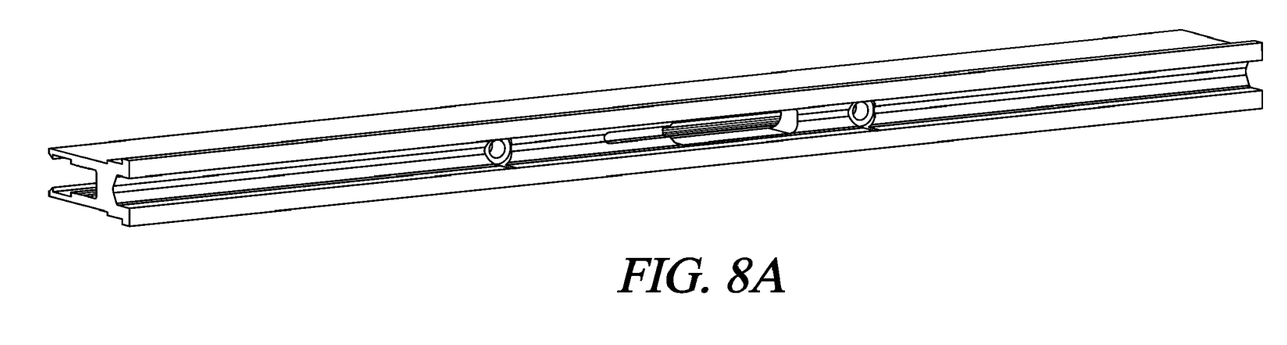
FIG. 8A is a top perspective view showing a female side of the frame.
Figure 8B:
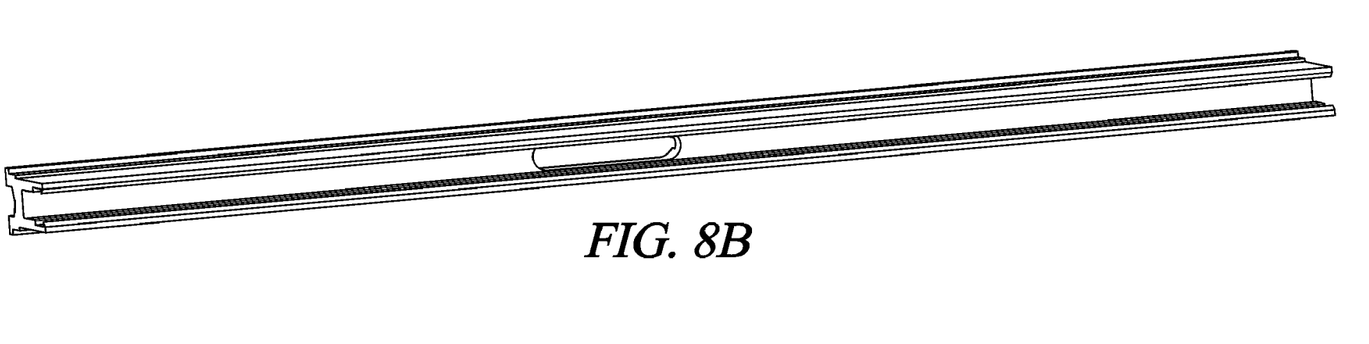
FIG. 8B is bottom perspective view showing a female side of the frame.
Figure 9:
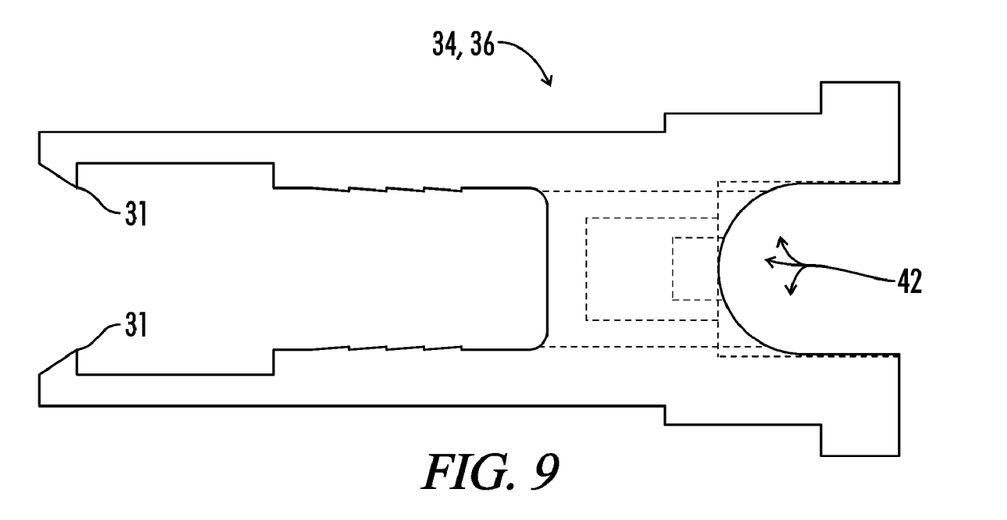
FIG. 9 is a side end view of the female side of the frame.

In a preferred embodiment the frame is composed of metal, such as aluminum, but can also be constructed of polymers. The protrusion 46 of one of the panels 32 is positioned to engage the channel 42 of an adjacent panel 32 to restrict movement of the panels in relation to one another. The engagement between the protrusion 46 and channel 42 preferably restricts both rotational and vertical movement of the panels in relation to one another. This can best be illustrated by FIG. 7 and FIGS. 2-3 showing engaged and disengaged embodiments of the male and female sides 36 and 38 of the frame 34.

The frame 34 is designed with panel gaps 35 spaced to accept the core. The fiber layers, polyurethane layers and skins are all placed over the frame on the external surfaces 52 and 54 to increase the bonding and engagement between the frame pieces 34. The external surfaces opposite 52 and 54 also get a fiber layer, polyurethane, and a skin.

Figure 10A:
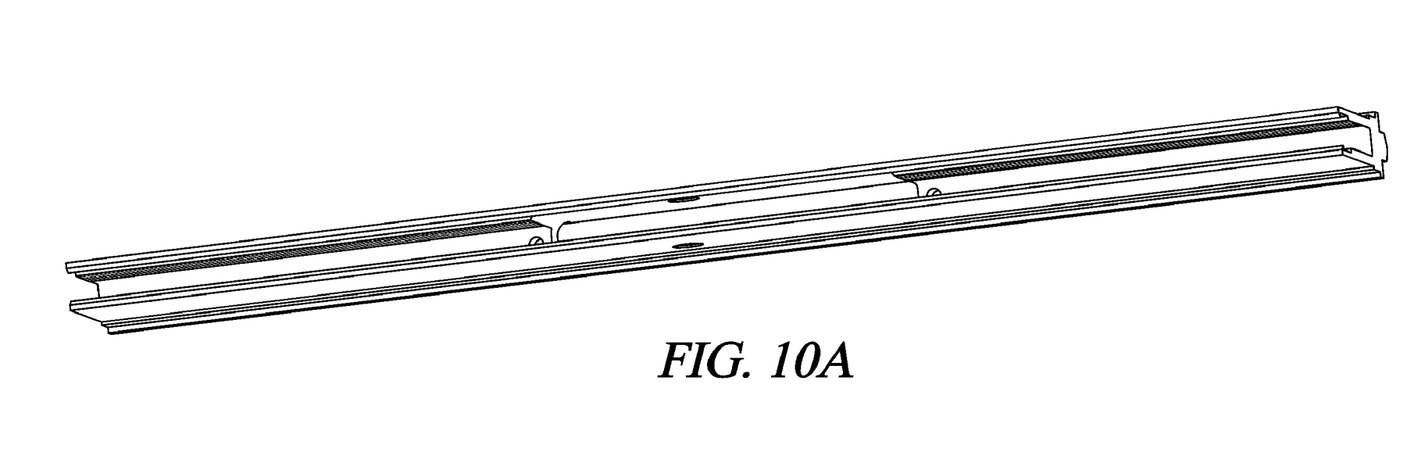
FIG. 10A is a bottom perspective view showing a male side of the frame.
Figure 10B:
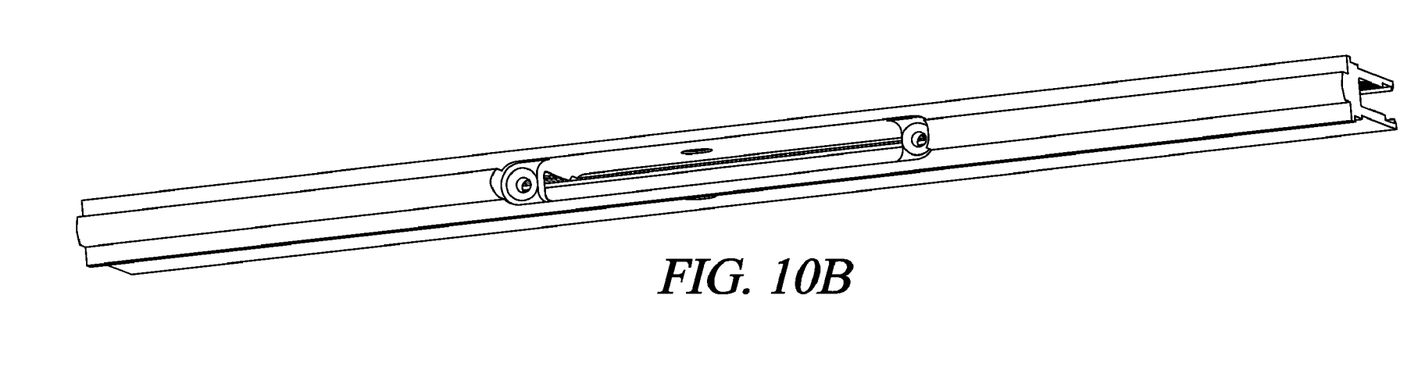
FIG. 10B is a top perspective view showing a male side of the frame
Figure 11:
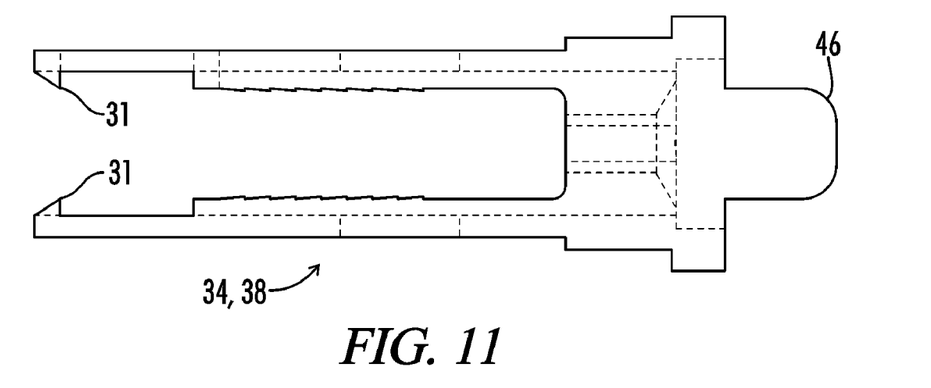
FIG. 11 is a side end view of the male side of the frame.
Figure 12A:
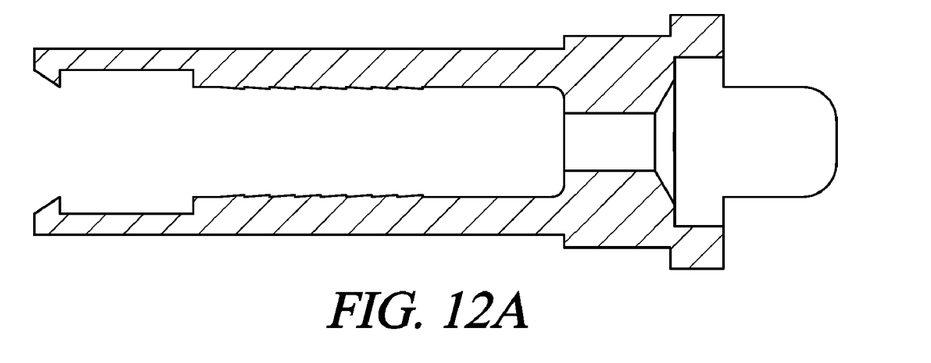
FIG. 12A is a cross-sectional view of the male portion shown in FIG. 11.
Figure 12B:
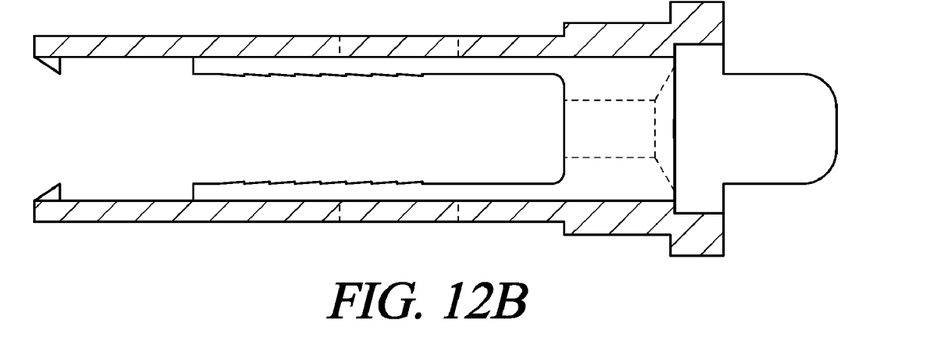
FIG. 12B is an alternate cross-sectional view of the male portion shown in FIG. 11.

The locking element 48 preferably includes a rotatable hook 56 that engages the extrusion of the female side or part 36. Fasteners such as screws 58 can hold in the hook or lock 56. This hook further facilitates the engagement between adjacent panels 32 during on-site assembly of the portable floor 30 and their disengagement upon disassembly of the floor after use. To engage the extrusion, the hook 56 is rotated, for example using a known device such as an Allen wrench that is inserted into hole 57. Correspondingly, the female side 36 includes engaging aperture 41 into which the locking element 48 engages to secure adjacent panels 32.

The floor panels 32 can also be constructed to include an alignment/lateral movement suppression system. The system comprises a gap in the protrusion 46 where the locking element 56 is located. This gap is used as a guide to mate to two pegs 62, which can be cap head screws, located in the female side 36. As such, corresponding floor panels 32 are aligned to establish a portable floor 30 that will be secure.

The extrusion incorporates at least one tooth 31 running the length of the extrusion on both sides of the channel 35. This tooth 31 is compressed so as to bite into the core to secure the frame to the core.

Another example of a device incorporating one of the current inventive panels is a table 64. The table 64 includes support legs 66 and a planar surface 68 attached to the support legs 66. The planar surface 68 includes one of the panels 10 and a top exterior skin 70 and bottom exterior skin 72. The top skin 70 and bottom skin 72 can be specifically designed for use as a table and can include corresponding edges 74 and 76 that engage and can be sealed together.

The table 64 can also include support structures 78 that are substantially equal to the core length 13. The support structures 78 can provide additional rigidity to the table 64. Additional support structures 80 can be positioned in the core 12 between the polyurethane layers 20 and 22. These supports can be used to attach the hardware from the legs 66 to the planar surface 68.

The bottom skin 72 can have recessed areas 73 positioned to accept the support structure 78. This can also provide a handle area by which to carry the tables 64. The table 64 can be made in both circular and polygonal shapes, such as rectangular, square and the like. Alternately, the legs 66 can be attached to the planar surface 68 or table top 68 by metal inserts that are integral to the bottom skin 72.

Thus, although there have been described particular embodiments of the present invention of a new and useful NEW PORTABLE PANEL CONSTRUCTION AND METHOD FOR MAKING THE SAME, it is not intended that such references be construed as limitations upon the scope of this invention except as set forth in the following claims.

What is claimed is:

1. A portable table, the portable table comprising foldable support legs; and
   a planar surface attached to the foldable support legs the planar surface including:
   a core having a length, a width, a first side and a second side;
   a first fiber layer attached to the first side;
   a second fiber layer attached to the second side;
   a first polyurethane layer impregnating the first fiber layer;
   a second polyurethane layer impregnating the second fiber layer;
   a top laminate skin attached to the first polyurethane layer, the top skin composed of a first material; and
   a bottom laminate skin attached to the second polyurethane layer, the bottom skin composed of a second material.

2. The portable table of claim 1, wherein the core further includes a plurality of openings, the opening substantially uniformly spaced along the width and length 3. The portable table of claim 1, further including a plurality of support structures positioned between the first and second laminate skins, at least one of the support structures is positioned in the core between the first and second polyurethane layers.

4. The portable table of claim 3, wherein at least one of the support structures includes a length substantially equal to the length of the core.

5. The portable table of claim 1, further includes an edge surrounding the planar surface.

6. The portable table of claim 1, wherein the second material includes a texture different from the first material.

* * * * *